Jan. 10, 1928.  
S. A. CRONE  
1,655,755  
RAILWAY BRAKE BEAM SUPPORT  
Filed Oct. 23, 1925
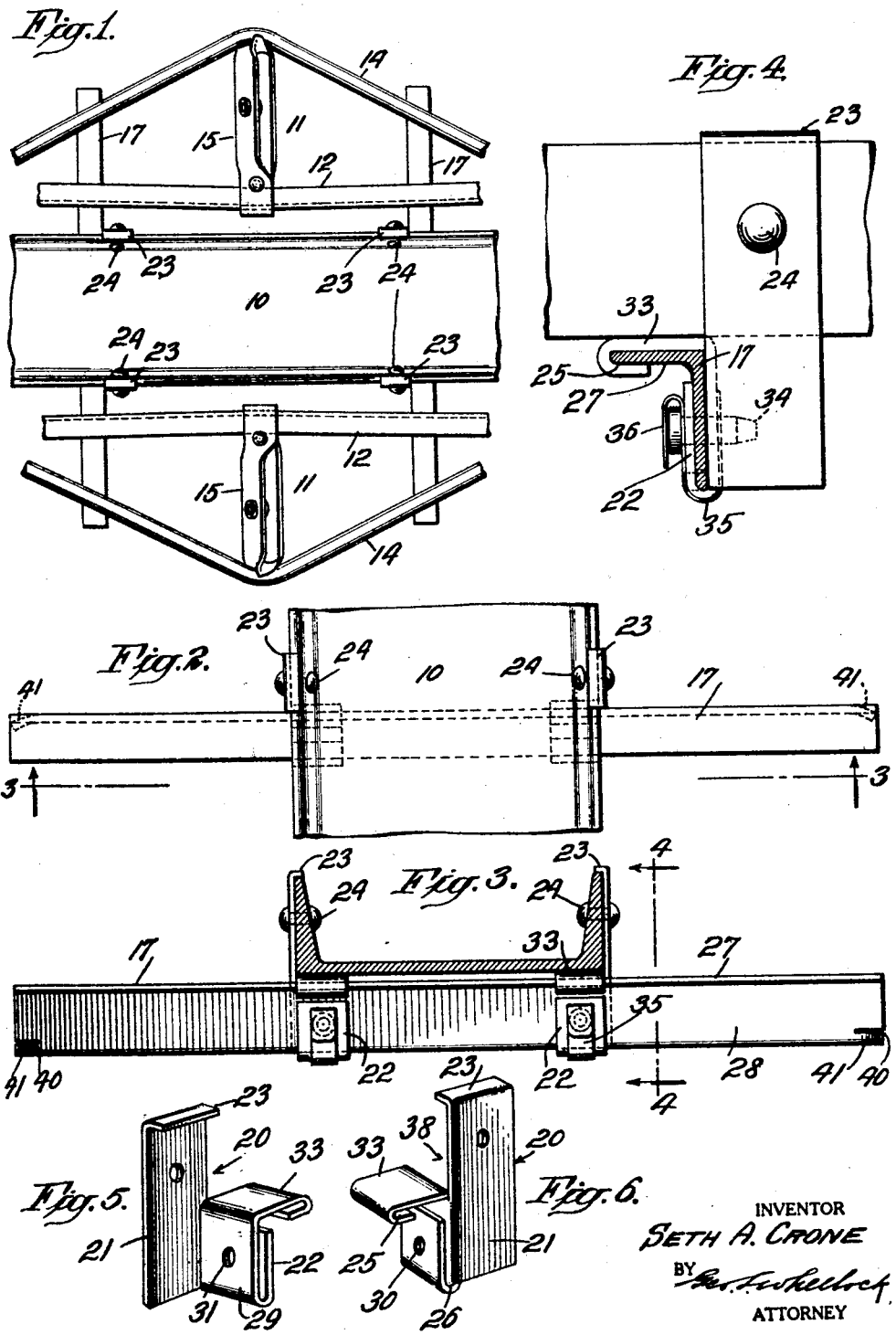
INVENTOR  
SETH A. CRONE  
BY  
ATTORNEY Patented Jan. 10, 1928.

1,655,755

UNITED STATES PATENT OFFICE.

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK.

RAILWAY-BRAKE-BEAM SUPPORT.

Application filed October 23, 1925. Serial No. 64,297.

The present invention relates to supports for brake beams and more particularly to the attachment of safety means to the spring plank or other portion of a car truck for supporting the brake beams in case their normal supports break or fail to operate.

The invention about to be described, while applicable to various forms of safety bars supported for many purposes, is of particular utility in connection with the mounting of safety angle bars on the opposite sides of a car truck to act as emergency supports for brake beams independently supported to extend transversely of the truck. The preferred form contemplates the mounting of supporting brackets on opposite sides of the spring plank at each end thereof, said brackets being formed from a single blank of metal, having one portion adapted to be secured to the side of the plank, and another portion bent to form a pair of seats substantially at right angles to each other. The seats of each bracket are in alignment with the seats of the adjacent bracket, so that safety angle bars may be mounted transversely of the spring plank and held rigidly in position by the seats so that they may extend outwardly therefrom sufficiently far to engage the brake beams in case of any derangement thereof. Suitable pins lock the bars to the supporting bracket and prevent longitudinal movement thereof.

An object of the present invention is to provide from a single metallic blank an effective supporting bracket for safety angle bars and the like, adapted to substantially encircle the bar and hold it rigidly in position; and to utilize one such bracket on each side of the spring plank of a car truck at the respective ends thereof for supporting a pair of safety bars extending transversely of the plank to furnish emergency supports for the brake beams on the respective sides thereof.

Other and further objects of the invention will be obvious upon an understanding of the illustrated embodiment about to be described or will be indicated in the appended claims, and various advantages secured by the invention other than those herein specifically referred to will occur to one skilled in the art, or become evident upon the employment of the invention in practice.

A preferred embodiment of the invention has been chosen for purposes of illustration and description, and is shown in the accompanying drawings, wherein Fig. 1 is a top plan view of a portion of a car truck illustrating the present invention applied to the spring plank and the relation of the brake beams thereto;

Fig. 2 is a top plan view of a portion of the spring plank showing a safety angle bar mounted thereon;

Fig. 3 is a cross-sectional view along the line 3—3 of Fig. 2 illustrating details of the invention;

Fig. 4 is a cross-sectional view along the line 4—4 of Fig. 3, showing a side view of a portion of the spring plank with a bracket and safety bar mounted thereon; and Figs. 5 and 6 are perspective views of the supporting bracket in different positions.

Referring to the drawings, there is shown a spring plank 10 of the well known channel form, with the usual type of inside hung trussed brake beams 11 on the respective sides thereof comprising a compression member 12, a tension member 14, and a strut 15 extending transversely of the central portions of the members and adapted to be attached to brake-applying devices not shown. It will be understood that at the juncture of the respective ends of the tension and compression members of the brake beams, brake shoes are attached for engagement with the four wheels of the truck when pressure is applied to move them away from the spring plank. These parts and their operation are well known in the art, and a more detailed description of them is believed to be unnecessary.

The brake beams 11 are supported normally by means of the brake shoes at their respective ends, which are hung from the framework of the car truck. However, since metallic bars are likely to cause derailment of car trucks in the event of their falling beneath them, it is of the utmost importance to eliminate any possibility of the loss of parts sufficiently large to endanger the proper movement of the trucks. Since the brake beams are constantly operated and their supporting parts are subjected to considerable wear, it is necessary to provide emergency supports for these members. In the present construction, the safety angle bars 17 extend sufficiently far from the spring plank 10 to positively support the brake beams and prevent their loss in case of any derangement thereof.

In attaching the safety bars 17 to the spring plank, there is provided a supporting bracket 20, (shown in detail in Figs. 5 and 6), having a flat portion 21 substantially longer than the width of the sides of the spring plank and flanged at its upper end 23 to extend over and depend from the upper side portion of the plank. This part 21 of the bracket is further secured to the side of the plank by means of a rivet 24. A pair of seats 25 and 26 for the sides 27 and 28 respectively of the safety bars are formed from a strip of metal integral with and at right angles to the portion of the flanged part 21 extending below the bottom of the spring plank by bending the upper portion 33 downwardly substantially at right angles to the portion 29 with the extremity thereof bent inwardly to form the seat 25; and by bending the lower part 29 of the strip upwardly at its extremity to form the seat 26. Since the strip of metal forming the seats 25 and 26 is at right angles to the flat part 21 attached to the spring plank, the portion 33 of the bracket may be formed to extend under the spring plank to eliminate protruding parts and to render the bracket more effective. The lengths of the portions 29 and 33 are substantially equal to the width of the sides of the safety angle bars so that when inserted in the seats formed therefor the edges of the angle bar will abut against the flanges forming the seats 25 and 26. A suitable pin 34 may extend through the apertures 30 and 31 and a corresponding aperture in the side 28 of the angle bar to lock it securely in position. The pin may be secured in position in any suitable manner, but preferably by means of a U-shaped locking member 35 formed of sheet metal adapted to fit about the lower portion of the seat 26, and having apertures to correspond with the apertures 30 and 31 therein, so that the pin may pass through the respective ends of the holding member when it is inserted through the safety bar. The elongated leg 36 of the holding member is bent downwardly over the head of the pin 34 to hold it securely in position. This form of locking means is shown in several of my copending applications, and no claim specific to it is made herein.

The present holding bracket may be formed in any suitable manner but for the sake of economy is formed from a single metallic blank which is substantially square with the exception of an extension 22 on one side thereof from which the seat 26 is formed. The upper central portion of the blank is slitted as shown at 38 so that the portion 33 may be bent downwardly and flanged to form the seat 25 at right angles to seat 26. The entire blank is bent along its longitudinal center adjacent the slitted portion to form members at right angles to each other. The blank for the support, the slit 38, the various apertures and the flanged portion 23 may be formed in a single operation. The other portions may be bent conveniently to form the seats 25 and 26 at right angles to each other.

Such a bracket is very rugged in construction and when applied to the spring plank, the member forming the seat 25 fits under the spring plank, while the flange 23 fits over the upper edge thereof facilitating a very rigid connection by means of the rivet 24. When two such brackets are placed on opposite sides of the plank, the respective seats therein are aligned so that a safety bar may slide therethrough and be in position to provide an emergency support for the brake beams. The parts of the bracket are under the spring plank with the exception of the strip of metal extending on the outside thereof and holding it in position, thereby affording a very effective arrangement of parts. While the pin 34 locks the safety bar in position, the ends of the bar may be slitted as shown at 40 and bent outwardly to form the locking lugs 41 to engage the seats 26 and prevent loss of the bar in case the pin should wear through or break.

It will be seen that the present invention comprises a supporting bracket formed from a single metallic blank which is bent to furnish three surfaces substantially perpendicular to each other with an end of one surface flanged over the spring plank and with the ends of the other two surfaces flanged to form seats for the sides of a safety angle bar, whereby it is substantially encircled when inserted therein. A pair of these brackets mounted at the respective ends of a spring plank furnish ideal supports for safety angle bars which may extend outwardly to engage and support the brake beams in case of any derangement thereof. All parts of the device are rugged in construction and securely fixed to each other to withstand the rough usage which they may encounter in actual service.

As various embodiments may be made in the invention above described, it is to be understood that all matter herein set forth is to be interpreted as illustrative and not in a limiting sense.

Having thus described my invention, I claim:—

1. A supporting bracket for safety bars, comprising a member bent at its center to form two portions substantially at right angles to each other and having the ends of said portions bent inwardly substantially to encircle an angle bar and means for attaching said member to the framework of a car truck.

2. A supporting bracket for safety bars, comprising an angle member having its ends bent inwardly substantially to encircle an angle bar and a second member integral with one edge of said angle member and at an angle thereto.

3. A supporting bracket for safety bars, comprising a metallic blank having three portions bent at right angles to each other, one of said portions constituting an attaching portion and the line of the bend of another of which portions extending longitudinally with the attaching portion, such other portion having an extremity bent back upon itself to form a seat.

4. A supporting bracket for safety bars, comprising a metallic blank having three portions bent substantially at right angles to each other, two of said portions being adapted to cooperate with each other in seating an angle bar, another of said portions extending beyond the two said portions and constituting the attaching portion of the bracket.

5. A supporting bracket for safety bars, comprising a metallic blank having a side portion bent substantially at right angles thereto with an extremity of said side portion bent back upon itself to form a seat for a safety bar, the bent back extremity extending upwardly in the same general direction as the length of the blank.

6. A supporting bracket for safety bars, comprising a metallic blank having a side portion bent at right angles thereto with the extremities of said side portion bent back upon themselves to form seats, said side portion being bent at its center to permit the sides of an angle bar to slide into said seats.

7. In a car truck having a spring plank and inside hung brake beams, the combination of a flat member adapted to be secured to the spring plank, an integral side portion at right angles thereto having its lower extremity bent upwardly to form a seat for a safety bar and having its upper extremity bent outwardly over said seat to secure the safety bar in position.

8. In a car truck having a spring plank and inside hung brake beams, the combination of flat member adapted to be secured to the spring plank, an integral side portion at right angles thereto having its lower extremity bent upwardly to form a seat for a safety bar and having its upper extremity bent outwardly over said seat to secure the safety bar in position, a safety bar partially encircled by said side portion, and a pin passing through said bar and one extremity of said side portion to secure said bar in position.

9. In a car truck having a spring plank and inside hung brake beams, the combination of a pair of supporting brackets mounted on each end of said spring plank, each of said brackets comprising a flat member adapted to extend over the side of the spring plank and be secured thereto, and an integral side portion bent at right angles to said member having its lower extremity bent upwardly to form a seat with its upper extremity bent outwardly over said seat, and safety angle bars mounted in the seats of each pair of supporting brackets and secured in position by said outwardly bent portions.

10. In a car truck having a spring plank an inside hung brake beams, the combination of a pair of supporting brackets on each end of said plank, each of said brackets having a flat member adapted to be secured to the side of the spring plank and having an integral side portion bent at an angle to said member and bent transversely of itself with its extremities flanged inwardly, and safety angle bars fitting in the integral side portions of each pair of said brackets with their sides engaging the flanges of said side portions.

SETH A. CRONE.